(12) United States Patent
Cho et al.

(10) Patent No.: US 7,646,803 B2
(45) Date of Patent: Jan. 12, 2010

(54) APPARATUS AND METHOD FOR ESTIMATING AND COMBINING FREQUENCY ERRORS IN A MOBILE COMMUNICATION SYSTEM

(75) Inventors: Dong-Kyoon Cho, Yongin-si (KR); Hee-Jin Roh, Suwon-si (KR); Jong-Han Lim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 387 days.

(21) Appl. No.: 11/649,020

(22) Filed: Jan. 3, 2007

(65) Prior Publication Data
US 2007/0153879 A1 Jul. 5, 2007

(30) Foreign Application Priority Data
Jan. 2, 2006 (KR) .................... 10-2006-0000217

(51) Int. Cl.
*H04L 27/06* (2006.01)
*H04B 1/707* (2006.01)

(52) U.S. Cl. ..................... 375/148; 375/344

(58) Field of Classification Search .............. 375/130, 375/140, 147, 148, 149, 316, 344
See application file for complete search history.

(56) References Cited

U.S. PATENT DOCUMENTS

| 5,515,401 | A | 5/1996 | Takenaka et al. |
| 5,774,799 | A | 6/1998 | Croft et al. |
| 6,289,061 | B1 * | 9/2001 | Kandala et al. ............. 375/344 |
| 6,631,174 | B1 | 10/2003 | Asahara et al. |
| 2003/0067970 | A1 * | 4/2003 | Kim .......................... 375/148 |
| 2004/0176148 | A1 | 9/2004 | Morimoto |
| 2004/0198277 | A1 * | 10/2004 | Yuan .......................... 455/136 |

* cited by examiner

*Primary Examiner*—Kevin M Burd
(74) *Attorney, Agent, or Firm*—The Farrell Law Firm, LLP

(57) ABSTRACT

An apparatus and method for estimating and combining frequency errors in a mobile communication system. A controller divides data received from a main base station (BS) and control information received from a neighbor BS and controls allocation to fingers. A main automatic frequency control (AFC) loop is formed by estimating and combining frequency errors of the data received from the main BS. A sub AFC loop is formed by subtracting a corrected value of the main AFC loop after estimating and combining frequency errors of the control information received from the neighbor BS.

24 Claims, 4 Drawing Sheets

APPARATUS AND METHOD FOR ESTIMATING AND COMBINING FREQUENCY ERRORS IN A MOBILE COMMUNICATION SYSTEM

PRIORITY

This application claims priority under 35 U.S.C. § 119(a) to an application filed in the Korean Intellectual Property Office on Jan. 2, 2006 and assigned Serial No. 2006-00217, the contents of which are incorporated herein by reference.

BACKGROUND OF THE INVENTION

1. Field of the Invention

The present invention generally relates to a mobile communication system, and more particularly to an apparatus and method for detecting and combining frequency errors.

2. Description of the Related Art

Wireless communication systems are mobile communication systems using a cellular communication scheme. These mobile communication systems make use of multiple access schemes for simultaneous communication with multiple users. Time Division Multiple Access (TDMA), Code Division Multiple Access (CDMA) and frequency division multiple access (FDMA) are typically used as the multiple access schemes. With the rapid development of CDMA technology, a CDMA system is developing from a voice communication system into a system capable of transmitting high-rate packet data.

Mobile communication systems are classified into synchronous mobile communication systems and asynchronous mobile communication systems. The asynchronous mobile communication system has been adopted in Europe and the synchronous mobile communication system has been adopted in the United States. The mobile communication system for use in Europe is referred to as a Universal Mobile Telecommunication System (UMTS). A mobile communication terminal for use in the UMTS is referred to as a user equipment (UE).

In the mobile communication systems, a frequency offset is a factor of unavoidable performance deterioration since a carrier frequency gradually varies with temperature. Automatic Frequency Control (AFC) is required for compensating for the frequency offset. In the mobile communication systems for high-rate packet data, a pilot signal is set to a reference signal of a Frequency Error Control (FEC) loop.

An average phase of the pilot signal can be computed during a pilot signal transmission interval. The phase variation can be computed from a continuous pilot signal since a pilot channel transmits an unmodulated signal. That is, coordinates of a currently received symbol can be estimated by performing an integrate & dump (I&D) process for a received signal during a pilot signal interval. The phase variation of the currently received symbol is computed from the coordinates of the currently received symbol and coordinates of a previously received symbol. A computed value acts as a linear estimation value of the low phase variation and is proportional to a frequency error. The phase variation occurs because a Mobile Station (MS) has relatively inaccurate timing as compared to a Base Station (BS) as a first reason and because a Doppler shift is made due to movement of a UE, that is, an MS, as a second reason.

FIG. 1 is a schematic diagram illustrating an example of an apparatus for estimating and combining frequency errors in a conventional MS.

Referring to FIG. 1, the MS includes an antenna 110 for transmitting a data signal to and receiving a data signal from a BS, a radio frequency (RF) processor 120 for low-noise amplifying and frequency downconverting the data signal received from antenna 110 or frequency upconverting and amplifying the signal to be transmitted to a wireless network, a reference clock or voltage-controlled temperature compensated crystal oscillator (VCTCXO) 160 for providing a reference frequency and a searcher (not illustrated in FIG. 1) for performing a basic search function. The MS further includes a controller 125 for allocating signals to fingers in order to demodulate detected signals. That is, the controller 125 allocates the signals to a finger-1 AFC section 130-1 to a finger-N AFC section 130-N.

The finger AFC sections 130-1 to 130-N include a despreader 131 for despreading an allocated signal, an accumulator 133 for accumulating the despread signal and a frequency error detector or cross product frequency difference detector (CPFDD) 135 for detecting a frequency error from the accumulated signal, respectively.

Outputs of the finger AFC sections 130-1 to 130-N are input to an AFC combiner 140. The AFC combiner 140 receives and combines frequency errors from the finger AFC sections 130-1 to 130-N and provides a combined output to an AFC converter 150. The AFC converter 150 is connected to an output path of the AFC combiner 140 and converts an accumulated frequency error component into an analog signal. That is, the AFC converter 150 converts the output of the AFC combiner 140 into the analog signal for controlling the reference clock 160.

The frequency error detectors 135 detect frequency errors from pilot signals received via independent fading paths. The AFC combiner 140 adjusts gain by combining the frequency errors and providing a combined output to a loop filter (not illustrated). At this time, independent frequency errors time-delayed due to multipath of a channel are also combined, such that the multipath diversity effect may be obtained and the performance of a control loop may be improved.

Next, a movement direction and finger allocation of an MS according to a BS in a mobile communication system for providing a high-rate packet data service will be described with reference to FIG. 2.

Referring to FIG. 2, a finger-1 205 and a finger-2 207 are allocated to receive data from a BS-A 201 in a cell 210 where the data is transmitted from one BS. A finger-3 209 and a finger-4 211 are allocated to receive media access control (MAC) information from neighbor BSs (for example, a BS-B 203 and a BS-C 213). When moving quickly from the BS-A 201 of the cell 210 to the BS-B 203 of a cell 230, the conventional MS may obtain the multipath diversity effect with respect to timing errors between the MS and the BSs by combining all the fingers (for example, the finger 1 to the finger 4), thereby improving the performance of a control loop.

The AFC combiner 140 may estimate the timing errors by combining all paths. However, the compensation of a Doppler shift may be cancelled out when paths of multiple BSs are combined. The Doppler shift needs to be considered since a Doppler effect increases as a spreading factor (SF) decreases in a mobile communication system for providing a high-rate data service.

SUMMARY OF THE INVENTION

An object of the present invention is to address at least the above problems and/or disadvantages and to provide at least the advantages described below. Accordingly, an object of the present invention is to provide an apparatus and method for estimating and combining frequency errors in a mobile communication system that can consider a Doppler shift when paths of multiple base stations (BSs) are combined.

Another object of the present invention is to provide an apparatus and method for estimating and combining frequency errors to provide a high-rate packet data communication service.

A further object the present invention is to provide an apparatus and method for estimating and combining frequency errors in a mobile communication system that can consider a Doppler shift by controlling a main automatic frequency control (AFC) loop and a sub AFC loop divided by BSs.

In accordance with an aspect of the present invention, there is provided an apparatus for estimating and combining frequency errors in a mobile communication system, including a controller for dividing data received from a main BS and control information received from a neighbor BS and controlling allocation to fingers; a main AFC loop formed by estimating and combining frequency errors of the data received from the main BS; and a sub AFC loop formed by subtracting a corrected value of the main AFC loop after estimating and combining frequency errors of the control information received from the neighbor BS.

In accordance with an aspect of the present invention, there is provided a method for estimating and combining frequency errors in a mobile communication system, including: dividing data received from a main BS and control information received from a neighbor BS and controlling allocation to fingers; forming a main AFC loop by estimating and combining frequency errors of the data received from the main BS; and forming a sub AFC loop by subtracting a corrected value of the main AFC loop after estimating and combining frequency errors of the control information received from the neighbor BS.

In accordance with an aspect of the present invention, there is provided a method for estimating and combining frequency errors in a mobile communication system, including detecting a correlation value between input signals; determining whether a magnitude of the correlation value is more than a signal detection threshold; allocating a new finger if the magnitude of the correlation value is more than the threshold; determining whether the finger is used for data received from a main BS or control information received from a neighbor BS; and forming a main AFC loop if the finger is used for the data and forming a sub AFC loop if the finger is used for the control information.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF PREFERRED EMBODIMENTS

The following detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Frequency error detectors detect frequency errors from pilot signals received via independent fading paths. An automatic frequency control (AFC) combiner adjusts gain by combining frequency errors and provides a combined output to a loop filter. At this time, independent frequency errors time-delayed due to multipath of a channel are also combined, such that the multipath diversity effect can be obtained and the performance of a control loop can be improved. The AFC combiner may estimate timing errors by combining all paths. However, the compensation of a Doppler shift may be cancelled out when paths of multiple BSs are combined. The Doppler shift should be considered since a Doppler effect increases as a spreading factor (SF) decreases in high-rate data communication.

A scheme for addressing at least the above problems occurring in the prior art will be described with reference to FIG. 3.

Figure 3:
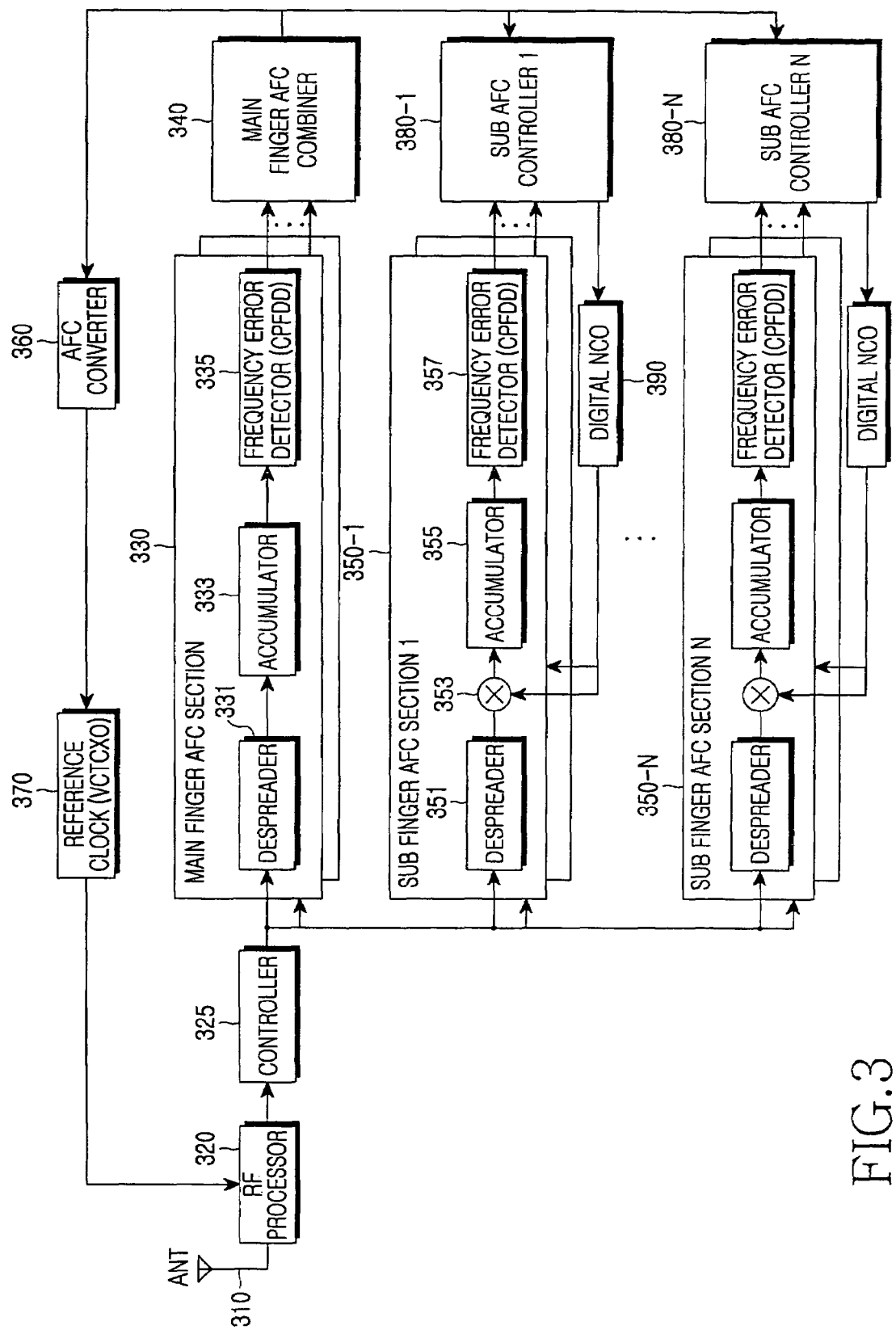
FIG. 3 is a block diagram illustrating an apparatus for estimating and combining frequency errors in a mobile communication system in accordance with the present invention.

FIG. 3 is a schematic diagram illustrating an apparatus for estimating and combining frequency errors in a mobile station (MS) in accordance with the present invention.

Figure 1:
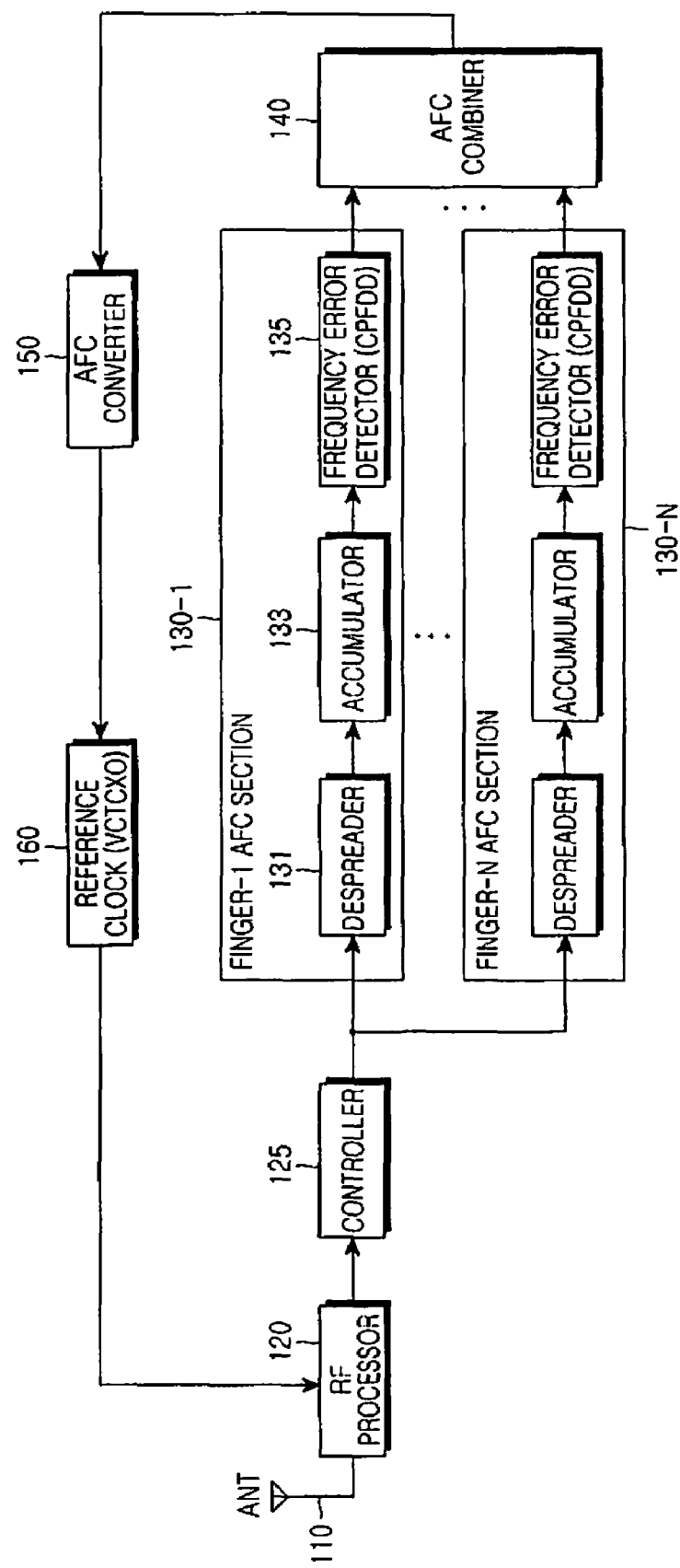
FIG. 1 is a block diagram illustrating an apparatus for estimating and combining frequency errors in a conventional mobile communication system.
Figure 2:
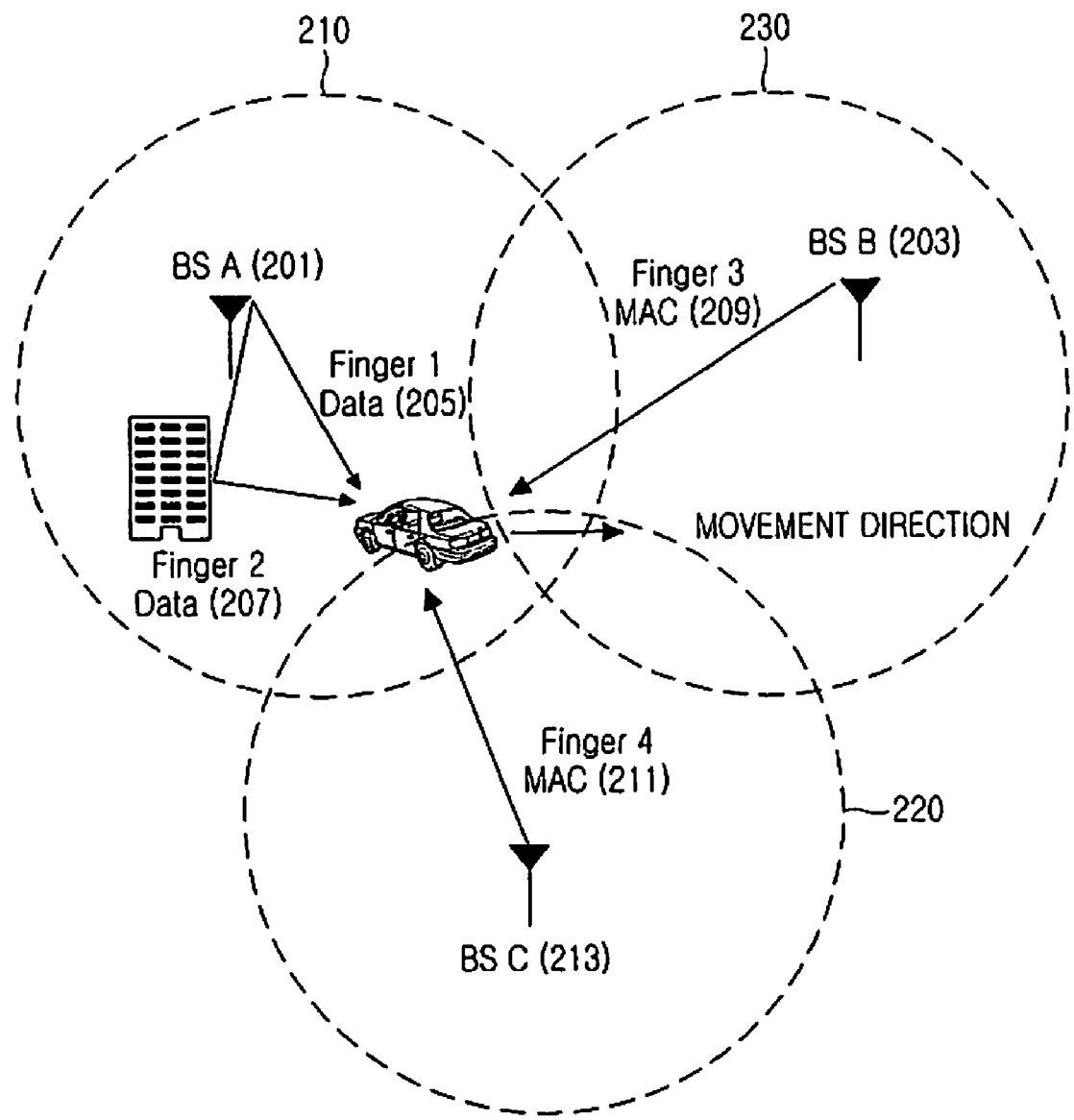
FIG. 2 illustrates an example of a movement direction and finger allocation of a mobile station according to a base station in a mobile communication system for providing a high-rate data service.

As illustrated in FIG. 3, the MS includes an antenna 310 for transmitting a data signal to and receiving a data signal from a mobile communication base station (BS), a radio frequency (RF) processor 320, a reference clock or voltage-controlled temperature compensated crystal oscillator (VCTCXO) 370 for providing a reference frequency, a searcher for performing a basic search function (not illustrated in FIG. 3) and a controller 325 for allocating signals to fingers in order to demodulate detected signals. The MS includes a main finger AFC section 330 for receiving data from a main BS (for example, the BS-A 201 of FIG. 2) and sub finger AFC sections 350-1 to 350-N for receiving media access control (MAC) information from neighbor BSs (for example, the BS-B 203 and the BS-C 213 of FIG. 2). The MS includes a main AFC combiner 340 for combining frequency errors of fingers for processing data of the main BS and an AFC converter 360 for converting an output of the main AFC combiner 340 into an analog signal for controlling the reference clock 370.

The main finger AFC section 330 is constructed with a despreader 331 for despreading a signal allocated to each finger, an accumulator 333 for accumulating the despread signal and a frequency error detector or cross product frequency difference detector (CPFDD) 335 for detecting a frequency error from the accumulated signal.

Components of the sub finger AFC sections 350-1 to 350-N are analogous to those of the main finger AFC section 330. A difference is that a multiplier 353 is additionally provided between a despreader 351 and an accumulator 355.

The MS includes sub AFC controllers 380-1 to 380-N for combining frequency errors of fingers used to detect MAC information of the neighbor BSs and controlling digital loop filters and digital numerically controlled oscillators (NCOs)

390 for correcting frequency errors under control of the sub AFC controllers 380-1 to 380-N.

As illustrated in FIG. 3, it can be seen that the sub AFC controllers 380-1 to 380-N and the digital NCOs 390 are newly added to the conventional structure. That is, the main AFC combiner 340 and the AFC converter 360 form a main AFC loop by controlling a main AFC control operation using a Doppler component and a drift component of a reference clock itself obtained from the frequency error detector 335. The main AFC combiner 340 and the AFC converter 360 periodically synchronize a reference clock frequency with a mobile communication BS frequency signal, such that a communication modem can continuously normally receive data from the main BS.

On the other hand, the sub AFC controllers 380-1 to 380-N combine frequency errors of fingers used to detect MAC information of the neighbor BSs. The sub AFC controllers 380-1 to 380-N form a sub AFC loop by controlling the associated digital NCO 390 by correcting an output value of the main AFC combiner 340, respectively, such that the MAC information of the neighbor BSs can be continuously received.

The MS operates, its RF processor 320 converts a received signal into a baseband signal. The searcher detects a correlation signal value between incoming signals and determines whether the magnitude of the detected correlation signal value is more than a predetermined signal detection threshold. If the magnitude of the detected correlation signal value is more than the predetermined signal detection threshold, the controller 325 allocates signals to fingers.

When the despreader 331 of each finger performs a despreading process by multiplying an allocated signal by a signal used upon spreading in the BS in time.

The accumulator 333 accumulates the multiplied signal in a symbol unit.

The frequency error detector 335 detects a frequency error using an accumulated pilot signal.

The main AFC combiner 340 combines $F_{Main,m}$ output from the frequency error detectors 335 of the fingers for receiving data of the main BS as shown in Equation (1). That is, an output value of the main AFC combiner 340 can be defined as shown in Equation (1).

$$F_{Main} = \sum_{m=1}^{M_{Main}} F_{Main,m} \qquad (1)$$

Herein, $M_{Main}$ is the number of fingers allocated to receive the data of the main BS.

The AFC converter 360 controls the reference clock 370 by converting a digital signal $F_{Main}$ of the main AFC combiner 340 into an analog signal.

On the other hand, the sub AFC controllers 380-1 to 380-N combine $F_{Sub\ n,m}$ output from the frequency error detectors 357 with respect to incoming signals from the associated neighbor BSs as shown in Equation (2). The sub AFC controllers 380-1 to 380-N output a digital NCO control value by subtracting a corrected output value of the main AFC combiner 340, respectively.

The digital NCO control value is output as shown in Equation (2).

$$F_{Sub\ n} = \sum_{m=1}^{N_{Sub\ n}} F_{Sub\ n,m} - \alpha F_{Main} \qquad (2)$$

Herein, $F_{Sub\ n}$ is an output of the sub AFC controller, $N_{Sub\ n}$ is the number of fingers allocated to receive MAC information of an n-th sub BS, $F_{Sub\ n,m}$ is an output of the frequency error detector 357, $F_{Main}$ is an output of the main AFC combiner 340, and α is a value for correcting an output value of the main AFC combiner 340. The α value is defined as shown in Equation (3).

$$\alpha = \frac{\text{Doppler Component of Main } BS}{\text{Drift Component of Reference Clock} + \text{Doppler Component of Main } BS} \qquad (3)$$

The digital NCO 390 eliminates a frequency error component mixed with an input of a sub finger according to the output of each of the sub AFC controllers 380-1 to 380-N, that is, the digital NCO control value.

The present invention provides a method for separating a main AFC loop and a sub AFC loop according to BSs for high-rate wireless data communication, and use the fact that Doppler components of the BSs are independent.

When the MS conventionally uses only a single AFC combiner for high-rate wireless data communication, there is a problem in that a Doppler effect may actually increase in the high-rate wireless data communication but the Doppler effect related to each BS may be cancelled out due to the single AFC combiner. However, since the Doppler components of BSs are independent as described above, the Doppler effects related to the BSs can be sufficiently considered by controlling the main AFC loop and the sub AFC loop divided by the BSs. Moreover, the present invention can be implemented by adding only small hardware since the digital NCO is applied only to the sub AFC loop without being applied to every finger.

The present invention divides the AFC loop into the main AFC loop and the sub AFC loop as described above. The present invention also provides a scheme for sufficiently considering the Doppler effect increased in high-rate wireless communication by synchronizing and stabilizing a frequency of a reference clock with a mobile communication BS signal through control in the main AFC loop and performing individual control using a digital NCO in the sub AFC loop. Thus, in a mobile communication system for providing a high-rate packet data service, time-consuming demodulation is possible and also MAC information of neighbor BSs can be continuously normally received.

Figure 4:
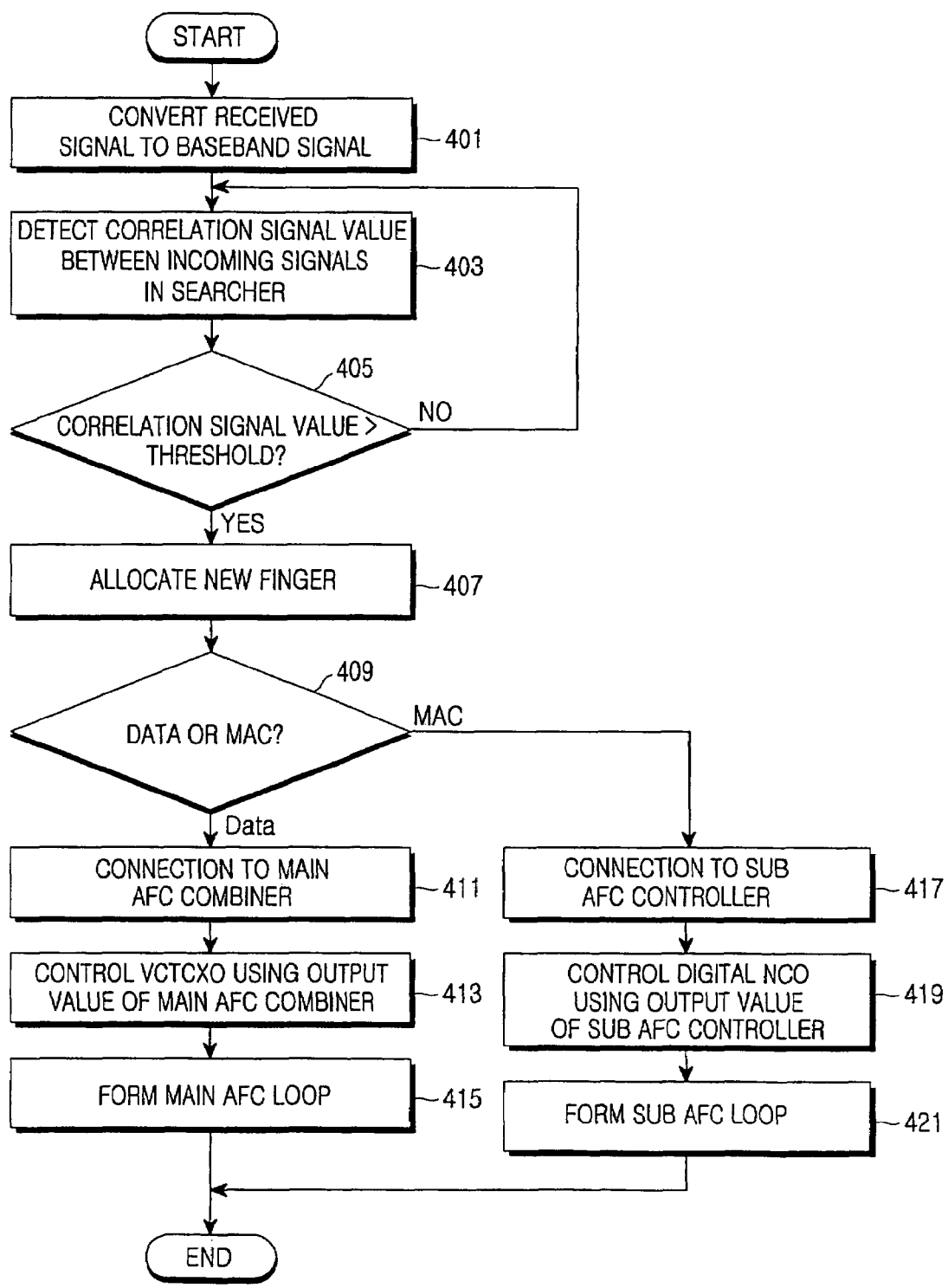
FIG. 4 is a flowchart illustrating a method for estimating and combining frequency errors in the mobile communication system in accordance with the present invention.

Next, a method for estimating and combining frequency errors in the mobile communication system in accordance the present invention will be described with reference to FIG. 4.

In step 401, the RF processor 320 of the MS converts a received signal into a baseband signal. In step 403, the searcher detects a correlation signal value between incoming signals. In step 405, the controller 325 determines whether the magnitude of the detected correlation signal value is more than a predetermined signal detection threshold. If the magnitude of the detected correlation signal value is not more than the threshold, the method returns to step 403 to detect a correlation signal value between incoming signals in the searcher. However, if the magnitude of the detected correlation signal value is more than the threshold, the controller 325 allocates signals to fingers in step 407. Then the controller 325 determines whether the fingers are used to process data of a main BS or to detect MAC information of neighbor BSs. If the fingers are used to process the data of the main BS, the controller 325 controls outputs of the frequency error detectors 335 to be connected to the main AFC combiner 340 in step 411. The main AFC combiner 340 combines frequency errors of signals transmitted from the main BS and controls the reference clock 370 in step 413. The reference clock 370 controls the RF processor 320, thereby forming a main AFC loop in step 415.

On the other hand, if the fingers are determined to be used to detect the MAC information of the neighbor BSs in step 409, the controller 325 connects outputs of the frequency error detectors 357 to the associated sub AFC controllers 380-1 to 380-N in step 417. The sub AFC controllers 380-1 to 380-N combine outputs of the frequency error detectors 357 for incoming signals from the associated neighbor BSs and control the digital NCOs 390 using a value computed by correcting an output value of the main AFC combiner 340 in step 419. The digital NCOs 390 control the associated fingers, thereby forming a sub AFC loop in step 421.

As apparent from the above description, the present invention has at least the following advantages.

The present invention considers a Doppler shift by separating a frequency error combiner into a frequency error combiner of fingers for receiving data and a frequency error combiner for receiving MAC information of a neighbor BS and combining paths of multiple BSs.

Moreover, the present invention reduces the degradation of AFC loop performance due to frequency error detection.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An apparatus for estimating and combining frequency errors in a mobile communication system, comprising:
a controller for dividing data received from a main base station (BS) and control information received from a neighbor BS and controlling allocation to fingers;
a main automatic frequency control (AFC) loop for forming main AFC loop by estimating and combining frequency errors of the data received from the main BS; and
a sub AFC loop for forming one or more sub AFC loops by subtracting a corrected value of the main AFC loop after estimating and combining frequency errors of the control information received from the neighbor BS.

2. The apparatus of claim 1, wherein the main AFC loop comprises:
a main finger AFC section for receiving data from the main BS and detecting frequency errors;
a main AFC combiner for combining the detected frequency errors; and
an AFC converter for converting an output of the main AFC combiner into an analog signal for controlling a reference clock.

3. The apparatus of claim 2, wherein the main finger AFC section is configured to include one or more fingers, which comprises:
a despreader for despreading a signal allocated to each finger;
an accumulator for accumulating the despread signal; and
a frequency error detector for detecting a frequency error from the accumulated signal.

4. The apparatus of claim 2, wherein an output value of the main AFC combiner is defined by:

$$F_{Main} = \sum_{m=1}^{M_{Main}} F_{Main,m},$$

where $F_{Main}$ is the output value of the main AFC combiner, $M_{Main}$ is the number of fingers allocated to receive the data of the main BS and $F_{Main,m}$ is an output of a frequency error detector of each finger.

5. The apparatus of claim 1, wherein the sub AFC loop comprises:
a sub finger AFC section for receiving the control information from the neighbor BS and detecting frequency errors;
a sub AFC controller for outputting a digital numerically controlled oscillator (NCO) control value by subtracting the corrected value of the main AFC loop after combining the detected frequency errors; and
a digital NCO for eliminating a frequency error component mixed with an input of a sub finger according to the digital NCO control value.

6. The apparatus of claim 5, wherein the sub finger AFC section is configured to include one or more fingers, which comprises:
a despreader for despreading a signal allocated to each finger;
a multiplier for multiplying the despread signal by a signal from which the frequency error component has been eliminated;
an accumulator for accumulating an output signal of the multiplier; and
a frequency error detector for detecting a frequency error from the accumulated signal.

7. The apparatus of claim 5, wherein the sub AFC controller outputs $$F_{Sub\,n} = \sum_{m=1}^{N_{Sub\,n}} F_{Sub\,n,m} - \alpha F_{Main},$$

where $F_{Sub\,n,m}$ is an output of a frequency error detector of a sub finger, $N_{Sub\,n}$ is the number of fingers allocated to receive control information of an n-th sub BS, $F_{Main}$ is an output value of a main AFC combiner and $\alpha$ is a value for correcting an output of the main AFC combiner.

8. The apparatus of claim 7, wherein the $\alpha$ value is defined by:

$$\alpha = \frac{\text{Doppler Component of Main } BS}{\text{Drift Component of Reference Clock} + \text{Doppler Component of Main } BS}.$$

9. A method for estimating and combining frequency errors in a mobile communication system, comprising:
dividing data received from a main base station (BS) and control information received from a neighbor BS and controlling allocation to fingers;

forming a main automatic frequency control (AFC) loop by estimating and combining frequency errors of the data received from the main BS; and forming one or more sub AFC loops by subtracting a corrected value of the main AFC loop after estimating and combining frequency errors of the control information received from the neighbor BS.

10. The method of claim 9, wherein forming the main AFC loop comprises:

receiving the data from the main BS and detecting frequency errors;

combining the detected frequency errors and providing a combined output; and converting the combined output into an analog signal for controlling a reference clock.

11. The method of claim 10, wherein detecting the frequency errors further comprises:

despreading a signal allocated to each finger;

accumulating the despread signal; and detecting a frequency error from the accumulated signal.

12. The method of claim 10, wherein when the frequency errors are combined, $$F_{Main} = \sum_{m=1}^{M_{Main}} F_{Main,m}$$

is output, where $F_{Main}$ is the output value of the main AFC combiner, $M_{Main}$ is the number of fingers allocated to receive the data of the main BS and $F_{Main,m}$ is an output of a frequency error detector of each finger.

13. The method of claim 9, wherein forming the sub AFC loop comprises:

receiving the control information from the neighbor BS and detecting frequency errors;

outputting a digital numerically controlled oscillator (NCO) control value by subtracting the corrected value of the main AFC loop after combining the detected frequency errors; and eliminating a frequency error component mixed with an input of a sub finger according to the digital NCO control value.

14. The method of claim 13, wherein detecting the frequency errors comprises:

despreading a signal allocated to each finger;

multiplying the despread signal by a signal from which the frequency error component has been eliminated and outputting the multiplied signal;

accumulating the multiplied signal; and detecting a frequency error from the accumulated signal.

15. The method of claim 13, wherein when the frequency errors are detected, $$F_{Sub\,n} = \sum_{m=1}^{N_{Sub\,n}} F_{Sub\,n,m} - \alpha F_{Main}$$

is output, where $F_{Sub\,n,m}$ is an output of a frequency error detector of a sub finger, $N_{Sub\,n}$ is the number of fingers allocated to receive control information of an n-th sub BS, $F_{Main}$ is an output value of a main AFC combiner and $\alpha$ is a value for correcting an output of the main AFC combiner.

16. The method of claim 15, wherein the α value is defined by:

$$\alpha = \frac{\text{Doppler Component of Main } BS}{\text{Drift Component of Reference Clock} + \text{Doppler Component of Main } BS}.$$

17. A method for estimating and combining frequency errors in a mobile communication system, comprising:

detecting a correlation value between input signals;

determining whether a magnitude of the correlation value is more than a predetermined signal detection threshold;

allocating a new finger if the magnitude of the correlation value is more than the threshold;

determining whether the finger is used for data received from a main base station (BS) or control information received from a neighbor BS; and forming a main automatic frequency control (AFC) loop if the finger is used for the data and forming one or more sub AFC loops by subtracting a corrected value of the main AFC loop, if the finger is used for the control information.

18. The method of claim 17, wherein forming the main AFC loop comprises:

receiving the data from the main BS and detecting frequency errors;

combining the detected frequency errors and providing a combined output; and converting the combined output into an analog signal for controlling a reference clock.

19. The method of claim 18, wherein detecting the frequency further errors comprises:

despreading a signal allocated to each finger;

accumulating the despread signal; and detecting a frequency error from the accumulated signal.

20. The method of claim 18, wherein when the frequency errors are combined, $$F_{Main} = \sum_{m=1}^{M_{Main}} F_{Main,m}$$

is output, where $F_{Main}$ is the output value of the main AFC combiner, $M_{Main}$ is the number of fingers allocated to receive the data of the main BS and $F_{Main,m}$ is an output of a frequency error detector of each finger.

21. The method of claim 17, wherein forming the sub AFC loop comprises:

receiving the control information from the neighbor BS and detecting frequency errors;

outputting a digital numerically controlled oscillator (NCO) control value by subtracting the corrected value of the main AFC loop after combining the detected frequency errors; and eliminating a frequency error component mixed with an input of a sub finger according to the digital NCO control value.

22. The method of claim 21, wherein detecting the frequency errors comprises:

despreading a signal allocated to each finger;

multiplying the despread signal by a signal from which the frequency error component has been eliminated and outputting the multiplied signal;

accumulating the multiplied signal; and detecting a frequency error from the accumulated signal.

23. The method of claim 21, wherein when the digital NCO control value is output, $$F_{Sub\,n} = \sum_{m=1}^{N_{Sub\,n}} F_{Sub\,n,m} - \alpha F_{Main}$$

is output, where $F_{Sub\,n,m}$ is an output of a frequency error detector of a sub finger, $N_{Sub\,n}$ is the number of fingers allocated to receive control information of an n-th sub BS, $F_{Main}$ is an output value of a main AFC combiner and $\alpha$ is a value for correcting an output of the main AFC combiner.

24. The method of claim 23, wherein the $\alpha$ value is defined by:

$$\alpha = \frac{\text{Doppler Component of Main } BS}{\text{Drift Component of Reference Clock} + \text{Doppler Component of Main } BS}.$$

* * * * *

UNITED STATES PATENT AND TRADEMARK OFFICE
CERTIFICATE OF CORRECTION

| | | |
|---|---|---|
| PATENT NO. | : 7,646,803 B2 | Page 1 of 1 |
| APPLICATION NO. | : 11/649020 | |
| DATED | : January 12, 2010 | |
| INVENTOR(S) | : Cho et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this

Sixteenth Day of November, 2010

David J. Kappos
*Director of the United States Patent and Trademark Office*